(12) United States Patent
Michele et al.

(10) Patent No.: US 7,885,947 B2
(45) Date of Patent: Feb. 8, 2011

(54) METHOD, SYSTEM AND COMPUTER PROGRAM FOR DISCOVERING INVENTORY INFORMATION WITH DYNAMIC SELECTION OF AVAILABLE PROVIDERS

(75) Inventors: Pescuma Michele, Rome (IT); Luigi Pichetti, Rome (IT); Alessandro Scotti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 833 days.

(21) Appl. No.: 11/755,966

(22) Filed: May 31, 2007

(65) Prior Publication Data
US 2008/0235225 A1 Sep. 25, 2008

(30) Foreign Application Priority Data
May 31, 2006 (EP) .................................. 06114775

(51) Int. Cl.
G06F 7/00 (2006.01)
G06F 17/30 (2006.01)
(52) U.S. Cl. ............................... 707/705; 707/999.006
(58) Field of Classification Search ........................ None
See application file for complete search history.

(56) References Cited

U.S. PATENT DOCUMENTS

| | | | | |
|---|---|---|---|---|
| 5,701,400 A * | 12/1997 | Amado | ........................ | 706/45 |
| 6,795,808 B1 * | 9/2004 | Strubbe et al. | .............. | 704/275 |
| 7,272,575 B2 * | 9/2007 | Vega | ........................... | 705/27 |
| 7,630,986 B1 * | 12/2009 | Herz et al. | ........................ | 1/1 |
| 7,730,063 B2 * | 6/2010 | Eder | ........................... | 707/736 |
| 2004/0049473 A1 * | 3/2004 | Gower et al. | ................... | 706/46 |
| 2005/0108200 A1 * | 5/2005 | Meik et al. | ...................... | 707/3 |
| 2006/0004753 A1 * | 1/2006 | Coifman et al. | ................. | 707/6 |
| 2006/0155751 A1 * | 7/2006 | Geshwind et al. | ........... | 707/102 |
| 2007/0087756 A1 * | 4/2007 | Hoffberg | .................... | 455/450 |
| 2007/0214133 A1 * | 9/2007 | Liberty et al. | .................. | 707/5 |
| 2008/0097975 A1 * | 4/2008 | Guay et al. | .................... | 707/4 |
| 2009/0299975 A1 * | 12/2009 | Coifman et al. | ................. | 707/3 |

* cited by examiner

Primary Examiner—F. Ryan Zeender
Assistant Examiner—Mussa Shaawat
(74) Attorney, Agent, or Firm—Jeffrey S. LaBaw

(57) ABSTRACT

A solution (200) for discovering inventory information in a data processing system is proposed. For this purpose, a corresponding discovery request is submitted (A1) to an inventory tool (200); the discovery request specifies a selected query pattern for the desired inventory information (for example, all the files included in a specific directory). Multiple providers (210)—such as of the interactive, cached or monitor type—are available for executing the required discovery operation. A predictive model (220) is associated with each provider; the models are used to estimate (A2,A3a,A3b-A4) the expected performance of the different providers for discovering the inventory information (according to the selected query pattern). In this way, it is possible to select (A5-A9) the provider, among the available ones, which is best suited for this purpose. The selected provider is then invoked (A10-A12) to discover the inventory information matching the selected query pattern. At the same time, the result of the discovery is used to refine (A13-A14) the models of the providers, so as to improve their accuracy.

10 Claims, 5 Drawing Sheets

METHOD, SYSTEM AND COMPUTER PROGRAM FOR DISCOVERING INVENTORY INFORMATION WITH DYNAMIC SELECTION OF AVAILABLE PROVIDERS

FIELD OF THE INVENTION

The present invention relates to the information technology field. More specifically, the invention relates to the discovery of inventory information in a data processing system.

BACKGROUND ART

Efficient management of resources of data processing systems is of the utmost importance in modern organizations. This problem is particular acute when the systems are very complex and dispersed across a large number of installations; moreover, the problem is further exacerbated in dynamic environments, wherein the configurations of the systems change continually. A typical example is the metering of software products that are used on the systems (such as for managing their licensing).

Any resource management application requires a thorough knowledge of each system to be controlled. For this purpose, inventory tools are exploited to collect information relating to the desired resources of the system; an example of commercial inventory tool available on the market is the "IBM Tivoli Common Inventory Technology or CIT" by IBM Corporation.

Some inventory tools (like the above-mentioned "CIT") interface with different plug-in components, known as providers. Each provider is adapted to discover the inventory information of an associated type of resources. In this way, the providers encapsulate all the knowledge of the corresponding resource types, so as to mask the different behavior of the myriad of possible resources to the inventory tool. Moreover, the inventory tool may be easily extended by adding new providers for any desired resource type.

Typically, multiple providers are available for each resource type. For example, a provider of the interactive (or standard) type always discovers the inventory information at runtime upon request. Conversely, a provider of the cached type saves the inventory information (which was discovered in response to previous requests) for its reuse in the future. Moreover, a provider of the monitor type maintains a mirror image of the system that may be used to satisfy any discovery request.

Each type of provider has its pros and cons. Particularly, the interactive provider supplies inventory information that is always up-to-date (since it is discovered on the fly); however, its response time may be very high. The cached provider instead returns the required inventory information immediately; however, the result may not correspond to the actual condition of the system at the moment. At the end, the monitor provider supplies up-to-date inventory information very fast; however, this involves an overhead of the system for updating the mirror image continuously.

Usually, a default provider is selected by a system administrator at the installation of the inventory tool (according to its expected use); the system administrator may also switch to another provider later on, in response to any observed change in the use of the inventory tool.

However, this solution is not satisfactory. Indeed, the default provider is necessary a compromise attempting to offer acceptable response times on the average; therefore, the default provider is not optimized for most of the discovery requests that are submitted to the inventory tool. In any case, the choice of the default provider strongly depends on the skill of the system administrator.

Some inventory tools known in the art also allow specifying a desired provider in any discovery request that is submitted thereto; in this way, it is possible to override the selection of the default provider for specific discovery requests (so as to use a different provider that is better suited for this purpose). However, the burden of selecting the optimal provider is now shifted to each resource management application exploiting the services offered by the inventory tool. Therefore, this increases the complexity of the resource management applications based on the inventory tool; moreover, the exploitation of this facility is not trivial (since the knowledge of the behavior of the inventory tool, and especially of its providers, may not be available to the different resource management applications). In this case as well, the choice of the provider must be performed manually.

All of the above adversely affects the performance of the inventory tool (and then of the resource management applications based thereon). Indeed, an erroneous choice of the provider may have deleterious effects on the operation of the inventory tool; for example, experimental results showed that the response times of different providers to the same discovery request may even span from a few minutes to some hours.

SUMMARY OF THE INVENTION

The invention proposes a method for discovering inventory information in a data processing system (such as a computer); a plurality of different providers for discovering the inventory information is available. The method starts with the step of receiving a request for discovering selected inventory information; the request is based on a selected query pattern. The method continues by estimating an indication of performance of each provider (for discovering the selected inventory information); the performance is estimated according to a predictive model of the provider depending on the selected query pattern. One of the providers is then selected according to the corresponding estimated performance. It is now possible to discover the selected inventory information by means of the selected provider. At the end, the models (or at least part of them) are updated according to a result of the discovery.

REFERENCE TO THE DRAWINGS

The invention itself, as well as further features and the advantages thereof, will be best understood with reference to the following detailed description, given purely by way of a non-restrictive indication, to be read in conjunction with the accompanying drawings, in which.

Figure 1:
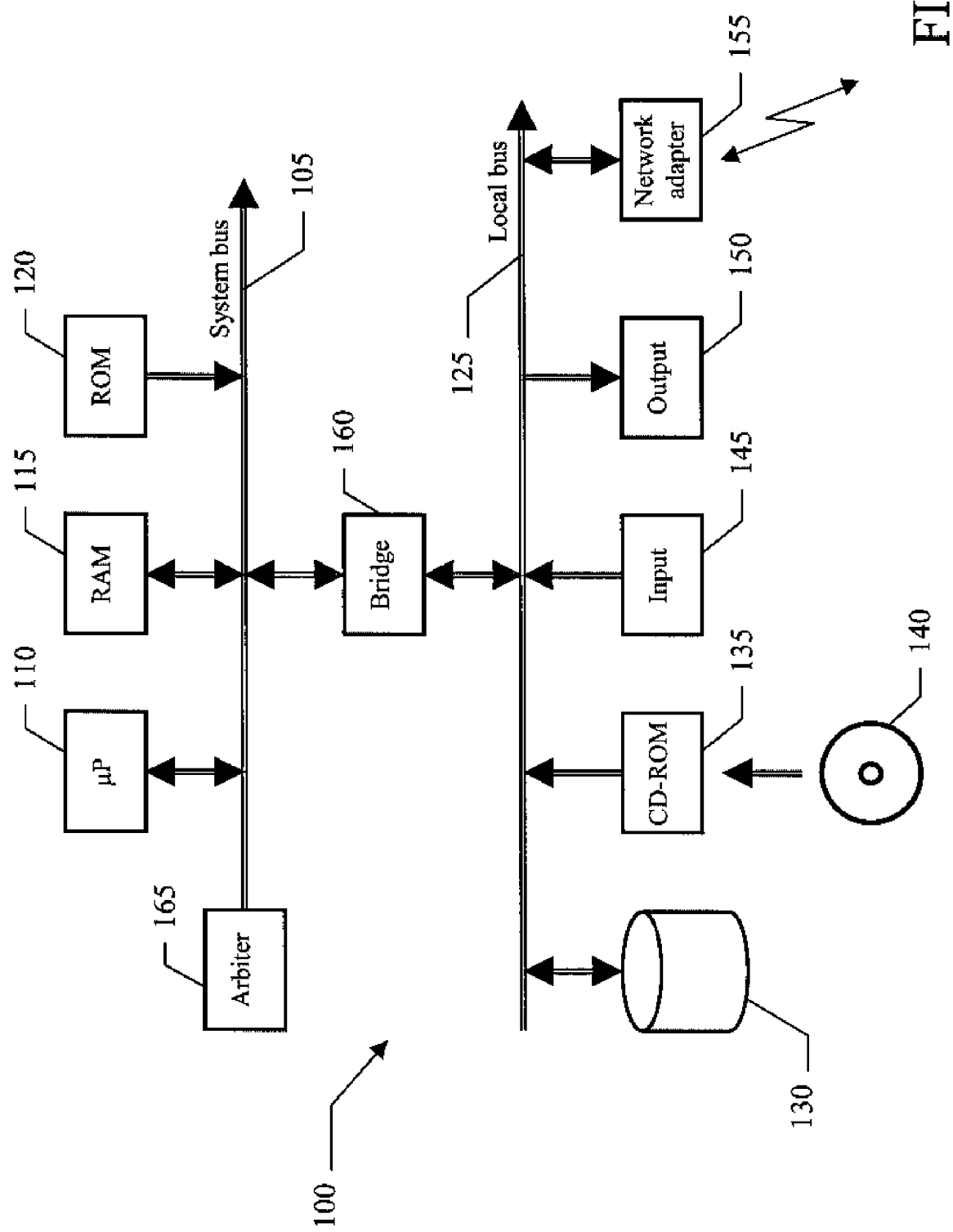
FIG. 1 shows the functional blocks of a data processing system in which the solution according to an embodiment of the invention is applicable.

DETAILED DESCRIPTION with reference in particular to FIG. 1, a data processing system 100 (for example, consisting of a Personal Computer) is shown. The computer 100 is formed by several units that are connected in parallel to a system bus 105. In detail, one or more microprocessors (µP) 110 control operation of the computer 100; a RAM 115 is directly used as a working memory by the microprocessors 110, and a ROM 120 stores basic code for a bootstrap of the computer 100. Several peripheral units are clustered around a local bus 125 (by means of respective interfaces). Particularly, a mass memory consists of one or more hard-disks 130 and drives 135 for reading CD-ROMs 140. Moreover, the computer includes input units 145 (for example, a keyboard and a mouse), and output units 150 (for example, a monitor and a printer). An adapter 155 is used to connect the computer 100 to a network. A bridge unit 160 interfaces the system bus 105 with the local bus 125. Each microprocessor 110 and the bridge unit 160 can operate as master agents requesting an access to the system bus 105 for transmitting information. An arbiter 165 manages the granting of the access with mutual exclusion to the system bus 105.

Figure 2:
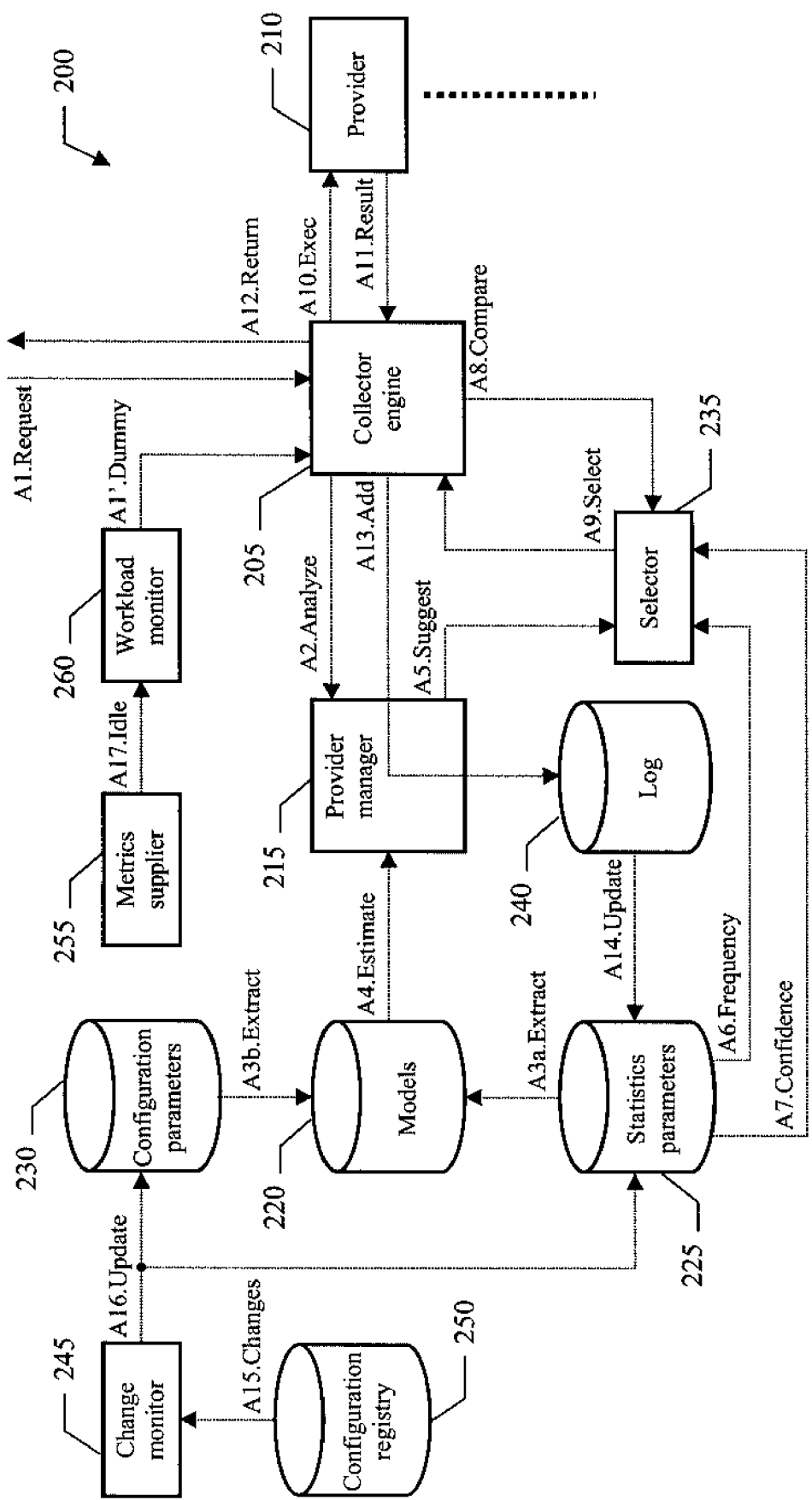
FIG. 2 is a collaboration diagram representing the roles of different components implementing the solution according to an embodiment of the invention.

Moving to FIG. 2, the main software components that run on the above-described computer are illustrated. The information (programs and data) is typically stored on the hard-disk and loaded (at least partially) into the working memory of the computer when the programs are running. The programs are initially installed onto the hard disk, for example, from CD-ROM. Particularly, the figure describes the static structure of the system (by means of the corresponding components) and its dynamic behavior (by means of a series of exchanged messages, which are denoted with progressive sequence numbers preceded by the symbol "A").

Particularly, an inventory tool 200 (such as the above-mentioned "CIT") implements a service for collecting inventory information relating to (physical or logical) resources controlled by the computer. For example, the resources of interest consist of files that are stored on the computer; typically, this information is used to identify software products installed on the computer by a license management application, so as to allow metering their usage (such as for charge-back accounting).

The core of the inventory tool 200 is a common collector engine (CCE) 205, which provides a single access point for the submission of different discovery requests relating to the collection of desired inventory information. Each discovery request specifies a selected type of resources (such as files in the example at issue). Generally, the discovery request is also based on a selected query pattern for filtering the inventory information. For example, the query pattern may indicate specific files to be searched (possibly identified by means of wild cards); moreover, it is possible to limit the search to specific directories of a file system of the computer. Other typical parameters of the query pattern are the size of the desired files, their attributes (such as executable files), and the like. In any case, the query pattern may also specify a maximum acceptable age of the returned inventory information, their minimum size, and so on.

For this purpose, the collector engine 205 interfaces with specific providers 210 (only one shown in the figure), which providers 210 discover the required inventory information for the different resource types; particularly, in the example at issue the providers 210 are adapted to retrieve the files (filtered according to any query pattern), which are available on the computer.

Each resource type is associated with multiple providers 210; for example, the corresponding resources may be discovered by an interactive provider 210 (retrieving the inventory information at runtime), a cached provider 210 (returning the inventory information that was discovered previously), and a monitor provider 210 (exploiting a mirror image of the computer). In the specific case of the files, the interactive provider 210 scans the (native) file system of the computer every time to discover the files matching the selected query pattern. Conversely, the cached provider 210 stores the list of the files discovered previously for each query pattern into an internal cache (by removing the result of any previous discovery request); typically, if the cache is full some inventory information is evicted to make room for the fresh one—according to a predefined replacement algorithm, for example, of the Least Recently Used (LRU) type. In addition, it is also possible to provide specific directives (implemented by means of a corresponding plan submitted to an external scheduler) for pre-fetching or refreshing the inventory information in the cache (such as periodically) and for invalidating the same inventory information (such as when its age reaches a threshold value). At the end, the monitor provider 210 maintains a mirror image of the file system of the computer in a similar cache (representing a tree of its directories, each one listing the files included therein); the monitor provider 210 is notified—by an operating system of the computer—of any change to the file system (i.e., consisting of the addition, update, move or deletion of directories/files), so as to allow maintaining its mirror image always up-to-date. Should the cache become full, the mirror image may be limited for some branches of the file system (by storing the name of the directory only, without its content); alternatively, in this case as well it is possible to evict selected inventory information according to any desired replacement algorithm.

In the solution according to an embodiment of the present invention (as described in detail in the following), the collector engine 205 maintains a predictive model of each provider 210; the model consists of an abstraction of the provider 210 (giving a simplified representation thereof), which allows estimating the expected performance of the provider 210 in response to discovery requests based on different query patterns. Whenever a discovery request is submitted, the collector engine 205 estimates the performance of all the providers 210 (associated with the selected resource type), which are available for discovering the desired inventory information (by evaluating their models according to the selected query pattern). In this way, it is possible to select the provider 210 (among the available ones) that is best suited for this purpose (i.e., with the highest estimated performance). The selected provider 210 is then used to discover the required inventory information. At the same time, the result of the discovery is used to refine the models of the available providers 210 (so as to improve their accuracy).

For example, it is possible to select the interactive provider 210 for resources that are fast to discover or volatile. Conversely, it is possible to select the cached provider 210 for resources that are difficult to discover. Alternatively, it is possible to use the monitor provider 210 for resources that exhibit a slow dynamic.

In this way, the selected provider 210 may be optimized for the specific query pattern of each discovery request that is submitted.

The proposed solution relieves any resource management application exploiting the services of the inventory tool of the burden of selecting the optimal provider 210 at any time. This reduces the complexity of the resource management applications based on the inventory tool.

In any case, the selection of the provider 210 is performed automatically (with no, or at least minimal, manual intervention by a system administrator).

All of the above has a beneficial impact on the performance of the inventory tool (and then of the resource management applications based thereon).

More specifically, a generic exploiter (not shown in the figure) submits a specific discovery request to the collector engine 205 (specifying the selected resource type and query pattern); the operation is performed by means of a discovery interface of the collector engine 205 exposing a set of pre-defined APIs (action "A1.Request"). The exploiters (such as a license management application, like the "IBM Tivoli License Configuration Manager, or ITLCM" by IBM Corporation) may be either local or remote (for example, accessing the services of the collector engine 205 through a common agent defined according to the "Service Management Framework or SMF" by IBM Corporation). The selected resource type is defined by a corresponding class in the object-oriented paradigm; for this purpose, the collector engine 205 owns a resource model (not shown in the figure), which defines the resource class and the associated providers 210 for each type of resources that may be available in the computer (for example, written in the "Unified Information Model or UIM" language).

In response thereto, the collector engine 205 determines the available providers 210 that are associated with the selected resource class (as indicated in the resource model); the list of the available providers 210 and the selected query pattern are then passed for their analysis to a provider manager 215 (action "A2.Analyze"). The provider manager 215 accesses a repository 220 storing the models of all the providers 210. As described in detail in the following, each model consists of a set of rules for calculating a fitness index of the corresponding provider 210; the fitness index is indicative of its performance for executing the operation required by the discovery request (depending on the selected query pattern). Typically, the fitness index is based on an estimated time that should be necessary to the available provider 210 for discovering the required inventory information; for example, the fitness index ranges from 0 (when the use of the available provider 210 is to be avoided because of a high estimated time) to 100 (when the use of the available provider 210 is recommend because of a low estimated time).

The rules always depend on the selected query pattern of the discovery request. The rules further depend on statistic parameters based on the results of previous discovery requests relating to the same query pattern. The statistic parameters for each query pattern are stored in a corresponding repository 225 (being calculated from historical information of the previous discovery requests, as it will be apparent in the following). Examples of these statistic parameters—for the providers 210 associated with the files—are an average number of files scanned at each iteration of the discovery operation, an average time required to access each scanned file, and so on. It should be noted that the entries of the repository 225 (one for every query pattern of each provider 210) generally remains at an acceptable low value (since the same query patterns are of ten repeated in the discovery requests).

Moreover, the rules also depend on configuration parameters of the computer. The configuration parameters are stored in a corresponding repository 230 (being initialized by a quick scan of the computer). Examples of these configuration parameters are an access time of the cache, a response time of the APIs of the operating system used to scan its file system, a size of the working memory (available for loading the cache), and the like.

The provider manager 215 retrieves the statistic parameters (if any) of each available provider 210 for the selected query pattern from the repository 225 (action "A3a.Extract"). At the same time, the provider manager 215 retrieves the configuration parameters (if any) specified in the models representing the same available providers 210 from the repository 230 (action "A3b.Extract"). At this point, the provider manager 215 can calculate the fitness index of each available provider 210 for the selected query pattern, by applying the corresponding rules with its (statistic and/or configuration) parameters suitably evaluated (action A4.Estimate").

The available provider 210 with the best fitness index (i.e., the highest one) is chosen as eligible to execute the discovery operation, and it is then notified to a selector 235 (action "A5.Suggest"). The selector 235 extracts a frequency of the previous discovery requests for the selected query pattern from the repository 225 (action "A6.Frequency"); for example, the frequency is based on an average time between each pair of previous discovery requests, which average time is normalized into a correction value ranging from 0.5 (low frequency) to 1.5 (high frequency). The selector 235 updates the fitness index of the eligible provider 210 according to the frequency of the discovery request (such as multiplying the fitness index by the corresponding correction value). In this way, the fitness index of the eligible provider 210 is reduced when the discovery request is submitted rarely, whereas it is increased when it is submitted very often. Therefore, the choice of the available provider 210 to be used is also based on the frequency of the discovery request. This prevents the change of the provider 215 for discovery requests that are unlikely to be submitted again (at least in the near future); this may avoid useless swapping of the available providers 210 (for example, when the cost of continually moving from an available provider 210 to another may defeat their improved performance).

Moreover, the selector 235 also extracts a confidence index of the eligible provider 210 from the repository 225 (action "A7.Confidence"). The confidence index is indicative of the accuracy of the corresponding model, and more specifically of the estimated fitness index for the selected query pattern. The confidence index is determined by comparing the estimated performance with the actual result of the corresponding previous discovery requests; for example, the confidence index is based on an average error between the estimated execution times and the actual execution times of the previous discovery operations, which error is normalized as above into a correction value ranging from 0.5 (low accuracy) to 1.5 (high accuracy). The selector 235 updates the fitness index of the eligible provider 210 according to the confidence index (such as multiplying the fitness index by the corresponding correction value). In this way, the fitness index of the eligible provider 210 is reduced when the model is not reliable yet (for example, because it is based on a few observations), whereas it is increased with its refinement over time. Therefore, the choice of the available provider 210 to be used is also based on the quality of the models. This prevents the change of the available provider 210 until it is very likely that this will actually improve the performance of the discovery operation; this may avoid useless swapping of the available providers 210 (for example, when enough evidence of any performance improvement is not available).

The selector 235 then compares the fitness index of the eligible provider 210 with the one of a current provider 210, which was used for the last discovery request—as indicated by the collector engine 205 (action "A8.Compare"). If their difference exceeds a predefined threshold (for example, 5-10), the eligible provider 210 is selected for replacing the current one in the execution of the discovery operation; conversely, the current provider 210 in maintained unchanged. As above, this feature prevents useless swapping of the available providers 210 (for example, when the cost of the change is comparable with its advantages).

The selected provider 210 (i.e., the eligible one or the current one) is then notified to the collector engine 205 (action "A9.Select). In response thereto, the collector engine 205 invokes the selected provider 210 (by passing the selected query pattern). The selected provider 210 discovers the inventory information corresponding to the selected query pattern and converts it into respective instances of the desired resource class (action "A11.Result"); this result is achieved by means of a method exposed by each provider 210, which method enumerates all the instances of the associated resource class matching any query pattern; in the example at issue, the selected provider 210 returns an instance for each file (with the desired characteristics) that is available on the computer. For this purpose, the selected provider 210 scans the file system of the computer (when of the interactive type), extracts the required inventory information from its cache (when of the cached type) or retrieves it from the mirror image of the file system (when of the monitor type). The collector engine 205 then returns the result of the discovery request to the corresponding exploiter (action "A12.Return").

At the same time, the result of the discovery request is also added to a log 240 (action "A13.Add"); in the example at issue, the log 240 stores the number of files that were scanned, the number of files that were found (i.e., matching the selected query pattern), the execution time of the discovery operation, and the like. As a consequence, the statistic parameters for the selected query pattern are updated accordingly in the repository 225 (action "A14.update"). For example, the average number of scanned files is calculated from the corresponding information of the previous discovery operations; likewise, it is calculated the average execution time of the previous discovery operations, so as to obtain the average access time of each scanned file by dividing the average execution time by the average number of scanned files.

In a completely asynchronous manner, a change monitor 245 accesses a configuration registry 250, which stores a current (hardware and/or software) configuration of the computer. The change monitor 245 continuously inquiries the configuration registry 250, so as to detect any change in the configuration of the computer (action "A.15.Change"). In response thereto, the configuration parameters in the repository 230 are updated accordingly (action "A16.Update"). Preferably, in this phase all the confidence indexes in the repository 225 are reset to 1 (to account for the fact that the available information may be not valid any longer for the new configuration of the computer).

Likewise, a metrics supplier 255 measures a parameter (or more) indicative of a workload of the computer; for example, the workload parameter consists of the processing power usage, the memory space occupation, the network activity, the amount of input/output operations, and the like. A workload monitor 260 continuously inquiries the metrics supplier 255; the workload monitor 260 detects an idle condition of the computer when the workload parameter falls below a predefined threshold value, such as 5-10% of the available processing power (action "A17.Idle"). In response thereto, the workload monitor 260 submits a dummy inventory request to the collection engine 205 (action "A1'.Dummy"). The dummy request specifies a selected available provider 210 (for a corresponding resource class) and a selected query pattern for which not enough observations are logged. The inventory operation of the dummy request is directly executed by the selected provider 210 (without returning its result to any exploiter); the result of the discovery operation is added as above to the log 240 and the corresponding statistic parameters are updated accordingly in the repository 225 (repeating the actions "A13.Add" and "A14.Update"). The operation is aimed at exciting the providers 210 that have not been used yet (for specific query patterns); this allows improving the accuracy of the corresponding models (for next estimations of the corresponding fitness indexes).

Figure 3A:
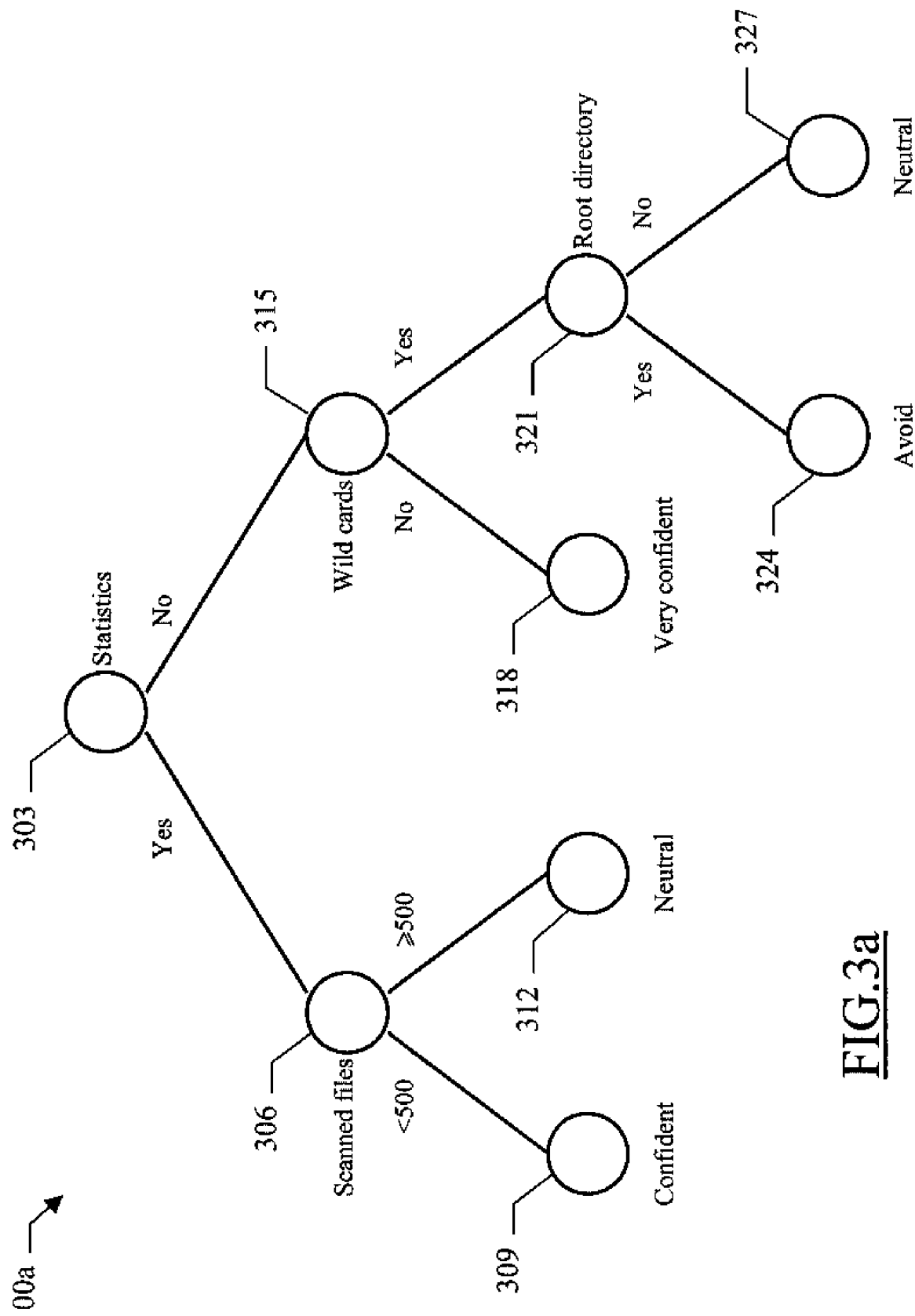
FIGS. 3a-3c illustrate decision trees describing exemplary implementations of the solution according to an embodiment of the present invention.
Figure 3B:
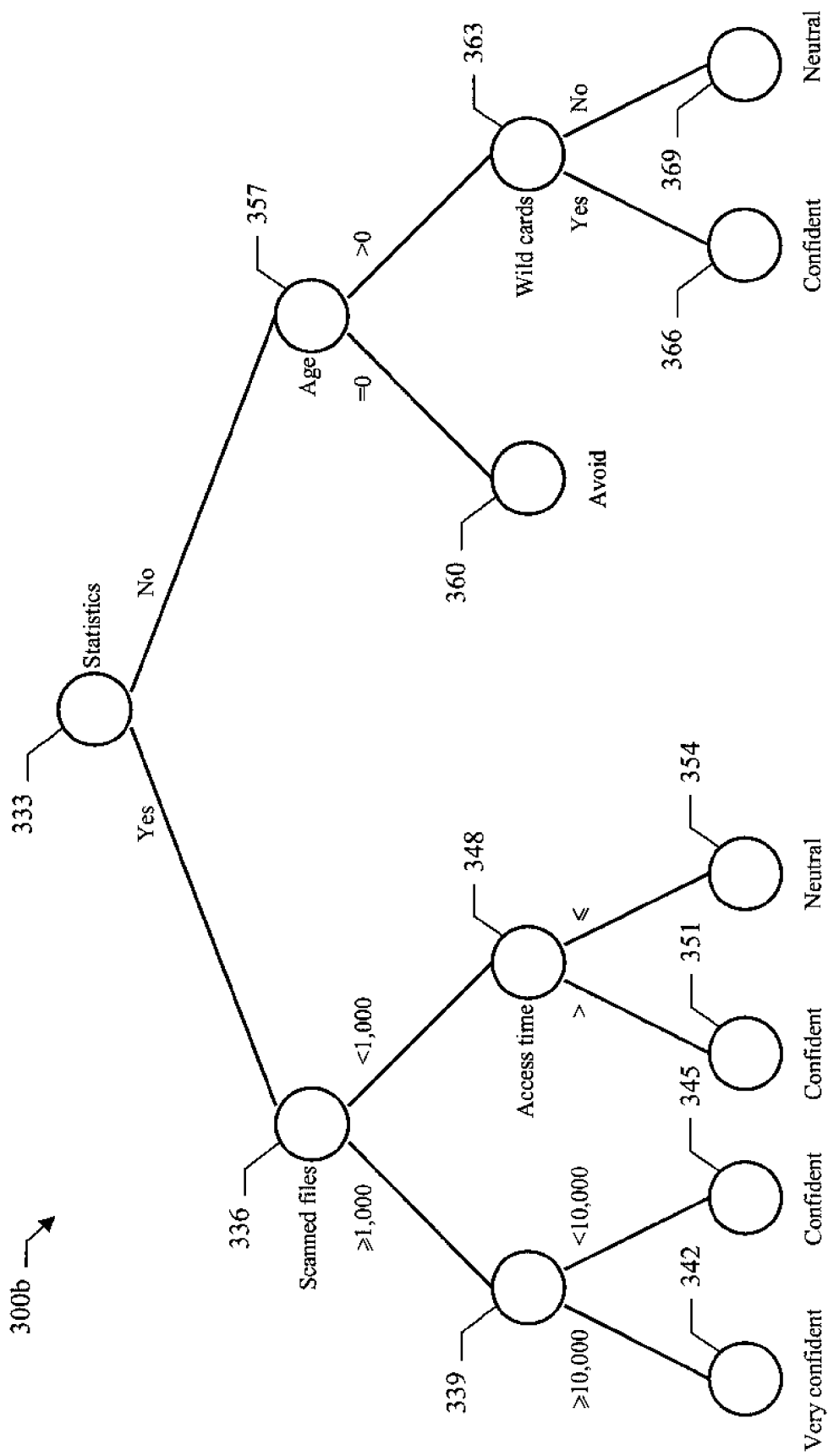
Figure 3C:
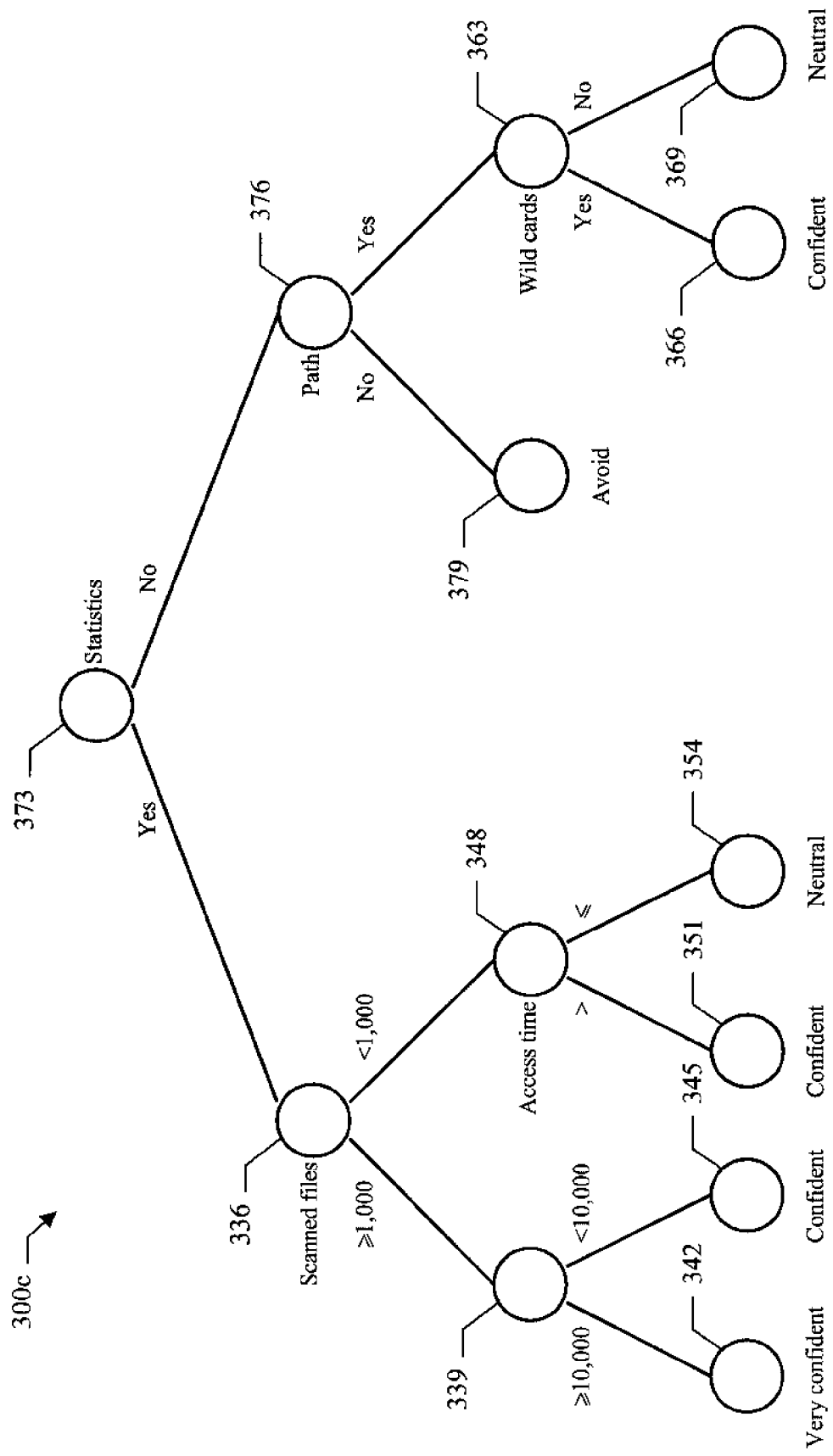

Exemplary rules implementing basic models of the providers associated with the files are illustrated with corresponding decision trees in FIGS. 3a-3c. Each decision tree is a graph of decisions, which includes non-leaf (or interior) nodes specifying different tests; the branches descending from each internal node correspond to the possible outcomes of the respective test. Each leaf node specifies possible values of the fitness index. The selected query pattern is assigned to the corresponding fitness index by sorting down the decision tree from its root node to the relevant leaf node.

Particularly, FIG. 3a shows a decision tree 300a implementing the rules for the interactive provider. The decision tree 300a includes a root node 303 based on the availability of the statistic parameters of the corresponding model for the selected query pattern. If so, a branch leading to an internal node 306 is followed. A test is now made on the average number of scanned files (for the previous discovery requests based on the selected query pattern). When the average number of scanned files is lower than a predefined value (such as 500, as defined according to the configuration parameters) the decision process ends to a leaf node 309, wherein the fitness index is assigned a confident value (such as 80); conversely, the decision process ends to a leaf node 312, wherein the fitness index is assigned a neutral value (such as 50).

Referring back to the root node 303, if the statistic parameters are not available (because enough discovery operations have not been executed yet for the selected query pattern), a different branch moving to an internal node 315 is followed. In this case, a test is made to verify whether the selected query pattern includes any wild cards. If not, the decision process ends to a leaf node 318, wherein the fitness index is assigned a very confident value (such as 90). Conversely, the decision tree 300a descends to a further internal node 321. A test is now made on any directory specified in the selected query pattern. When the selected query pattern specifies a directory close to a root of the file system (for example, the root directory itself or a sub-directory directly depending thereon), the decision process ends to a leaf node 324, wherein the fitness index is assigned an avoid value (such as 10); conversely, the decision process ends to a leaf node 327, wherein the fitness index is assigned the neutral value.

FIG. 3b instead shows a decision tree 300b implementing the rules for the cached provider. The decision tree 300b likewise includes a root node 333 based on the availability of the statistic parameters of the corresponding model for the selected query pattern. If so, a branch leading to an internal node 336 is followed. A test is now made on the average number of scanned files. If the average number of scanned files reaches a predefined value (such as 1,000, as defined according to the configuration parameters) the decision tree 300b descends to a further internal node 339. If the average number of scanned files also reaches a higher predefined value (such as 10,000, again defined according to the configuration parameters) the decision process ends to a leaf node 342, wherein the fitness index is assigned the very confident value; conversely (i.e., when the average number of scanned files is comprised between 1,000 and 10,000), the decision process ends to a leaf node 345, wherein the fitness index is assigned the confident value.

Returning to the internal node 336, if the average number of scanned files is lower that 1,000 another branch leading to a further internal node 348 is followed. The average access time of the scanned files is then compared with an access time of the cache (as defined by the configuration parameters). When the average access time of the scanned files is higher than the access time of the cache, the decision process ends to a leaf node 351, wherein the fitness index is assigned the confident value; conversely, the decision process ends to a leaf node 354, wherein the fitness index is assigned the neutral value.

Referring back to the root node 333, if the statistic parameters are not available, a different branch moving to an internal node 357 is followed. In this case, a test is made to verify whether the maximum acceptable age of the inventory information (specified in the inventory request) is zero. If so, the decision process ends to a leaf node 360, wherein the fitness index is assigned the avoid value. Conversely, the decision tree 300b descends to a further internal node 363. In this case, a test is made to verify whether the selected query pattern includes any wild cards. If so, the decision process ends to a leaf node 366, wherein the fitness index is assigned the confident value; conversely, the decision process ends to a leaf node 369, wherein the fitness index is assigned the neutral value.

At the end, FIG. 3c shows a decision tree 300c implementing the rules for the monitor provider. The decision tree 300c resembles the one described above with reference to the cached provider (with the common nodes already shown in FIG. 3b that are denoted with the same references, omitting their explanation of the sake of brevity). Indeed, the behavior of the cached provider and of the monitor provider is very similar, with their main difference consisting of the updating policy of the respective caches (at the discovery requests for the cached provider and at runtime for the monitor provider).

Particularly, the decision tree 300c again includes a root node 373 based on the availability of the statistic parameters of the corresponding model for the selected query pattern. If so, a branch leading to the nodes 336-354 is followed. As above, when the average number of scanned files (nodes 336, 339) is equal or higher than 10,000 the fitness index is assigned the very confident value (node 342), and when it is comprised between 1,000 and 10,000 the fitness index is assigned the confident value (node 345); conversely, when the average number of scanned files (nodes 336) is lower than 1,000 the fitness index is assigned the confident value (node 351) when the average access time of the scanned files is higher than the access time of the cache or it is assigned the neutral value (node 354) otherwise.

Referring back to the root node 373, if the statistic parameters are not available, a different branch moving to an internal node 376 is followed. In this case, a test is made on any directory specified in the selected query pattern. When the selected query pattern specifies a directory that is not included in the mirror image of the file system maintained in the cache, the decision process ends to a leaf node 379, wherein the fitness index is assigned the avoid value. Conversely, the decision tree 300c descends to the nodes 363-369. As above, when the query pattern (node 363) includes any wild cards the fitness index is assigned the confident value (node 366), whereas otherwise it is assigned the neutral value (node 369).

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the computer has a different architecture or includes equivalent units; in any case, it is possible to replace the computer with any code execution entity (such as a PDA, a mobile phone, and the like). Although in the preceding description reference has been made to a stand-alone computer for the sake of simplicity, it should be understood that the proposed solution typically finds application in a data processing system with distributed architecture (for example, on each endpoint of a license management infrastructure controlled by one or more runtime servers that report to a common administration server).

It is emphasized that the reference to the resource class of the files must not to be constructed as a limitation. Indeed, the same technique may also be used to discover whatever physical or logical resources, such as hardware devices, software programs, services, databases, messaging queues, network addresses, users, roles, organizations, business activities, and the like.

It should be readily apparent that the exploitation of the present invention is not restricted to any specific license management application; more generally, the same solution may find application in software distribution applications, or for whatever management purpose.

Similar considerations apply if a different number or type of providers (down to only two) is available for each resource class; for example, it is possible to have multiple providers of the same type with different configurations—such as the size of the cache for the cached or monitor providers.

Likewise, the described discovery requests with their query patterns are merely illustrative. Moreover, the query patterns may be classified according to other criteria for the application of the models (for example, by sorting them into a predefined number of categories defined by specific characteristics). Naturally, it is possible to use alternative rules for evaluating the models; in any case, different techniques may be used for defining the models and/or for their training (such as based on neural networks).

Alternatively, any other index—or combination of indexes—may be used to represent the estimated performance of the providers (even based on different indicators, such as their processing cost).

The above-described statistic parameters are in no way comprehensive, and they may be replaced and/or integrated with any other values depending on the results of the previous discovery operations (such as the average processing time, number of I/O operations, or number of network operations). Alternatively, the statistic parameters may be calculated from a subset of the (most recent) previous discovery requests available; moreover, it is possible to use any other suitable formula for their calculation (for example, based on the Root-Mean-Square, or RMS, value of the available observations, on their variance, and so on).

Likewise, the average number and the average access time may relate to any other entity to be scanned during the discovery operations (such as ports or network addresses).

Similar considerations apply if the idle condition of the computer is detected in a different way (for example, by combining multiple workload parameters). In any case, the feature of simulating dummy requests (for exciting the providers not used yet) is not strictly necessary, and it may be omitted in some implementations of the invention.

Likewise, the changes in the configuration of the computer may be detected with other techniques (for example, interfacing with an installation engine of a software distribution application). However, the feature of updating dynamically the configuration parameters is merely optional; moreover, the models may also be implemented independently of these configuration parameters.

Nothing prevents using alternative indicators of the frequency of the discovery requests for each query pattern (for example, based on corresponding discovery operations executed in a predefined time window).

Similar considerations apply to the definition of the confidence of the fitness indexes (with the possibility of using any other index—or combination of indexes—to estimate the accuracy of the models).

However, an alternative implementation wherein the selected provider is chosen even without taking into account the frequency of the previous discovery requests and/or the confidence of the models is not excluded.

Moreover, other policies for deciding the replacement of the current provider may be implemented (for example, by switching to the eligible provider only after two or more consecutive suggestions). In any case, an implementation wherein the selected provider is always used to execute the discovery operation (irrespective of the extent of the performance increase with respect to the current provider) is within the scope of the invention.

In any case, the information relating to the frequency, the confidence index, and/or the current provider may be used in any other way to affect the choice of the selected provider (for example, by updating the fitness indexes of the available providers directly).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

In any case, the solution according to the present invention lends itself to be carried out with a hardware structure (for example, integrated in a chip of semiconductor material), or with a combination of software and hardware.

The invention claimed is:

1. A method for discovering inventory information in a data processing system, wherein a plurality of different providers for discovering the inventory information is available, the method including the steps of:

receiving, by the system, a request for discovering selected inventory information based on a selected query pattern, by an inventory tool on the system, estimating an indication of performance of each provider for discovering the selected inventory information, the performance being estimated according to a predictive model of the provider depending on the selected query pattern, selecting one of the providers according to the corresponding estimated performance, discovering the selected inventory information by means of the selected provider, and updating at least part of the models according to a result of the discovery; and detecting an idle condition of the system according to a measured workload thereof, simulating the receiving of a dummy request for discovering further selected inventory information based on a further selected query pattern in response to the idle condition, the dummy request being associated with a further selected provider, further discovering the further selected inventory information by means of the further selected provider, and updating at least part of the models according to a result of the further discovery.

2. The method according to claim 1, wherein the estimated performance is indicative of a time required to discover the selected inventory information.

3. The method according to claim 1, wherein each model includes at least one statistic parameter depending on the results of previous discoveries for each query pattern, the step of updating including:

updating the at least one statistic parameter for the selected query pattern according to the result of the discovery.

4. The method according to claim 3, wherein each discovery involves scanning entities available on the system, the at least one statistic parameter being based on an average number of the scanned entities and/or on an average time required to access each scanned entity.

5. The method according to claim 1, wherein each model includes at least one configuration parameter depending on a configuration of the system, the method further including the steps of:

detecting-any change in the configuration of the system, and updating the at least one configuration parameter in response to the change.

6. The method according to claim 1, further including the step of:

logging an indication of frequency of previous requests for each query pattern, the step of selecting being further performed according to the frequency of the selected query pattern.

7. The method according to claim 1, further including the step of:

determining an indication of confidence of the estimated performance of each model, wherein the confidence is determined according to an error between the estimated performance and the result of the previous discoveries for the selected query pattern, the step of selecting being further performed according to the confidence of the estimated performance.

8. The method according to claim 1, wherein the step of selecting further includes:

comparing the estimated performance of one of the providers eligible to be selected with the estimated performance of a current one of the provider selected for a last discovery for the selected query pattern, and switching to the eligible provider or maintaining the current provider according to the comparison.

9. A computer program product in a non-transitory, computer-usable storage medium the computer program when executed on a data processing system causing the system to perform a method for discovering inventory information in the system, wherein a plurality of different providers for discovering the inventory information is available, the method including the steps of:

receiving, by the system, a request for discovering selected inventory information based on a selected query pattern, by the system, estimating an indication of performance of each provider for discovering the selected inventory information, the performance being estimated according to a predictive model of the provider depending on the selected query pattern, selecting one of the providers according to the corresponding estimated performance, discovering the selected inventory information by means of the selected provider, and updating at least part of the models according to a result of the discovery; and detecting an idle condition of the system according to a measured workload thereof, simulating the receiving of a dummy request for discovering further selected inventory information based on a further selected query pattern in response to the idle condition, the dummy request being associated with a further selected provider, further discovering the further selected inventory information by means of the further selected provider, and updating at least part of the models according to a result of the further discovery.

10. A discovery tool for discovering inventory information in a data processing system, wherein a plurality of different providers for discovering the inventory information is available, the discovery system including:

a memory for storing computer instructions;

a processor for executing the stored computer instructions;

a collector engine for receiving a request for discovering selected inventory information based on a selected query pattern, a provider manager for estimating an indication of performance of each provider for discovering the selected inventory information, the performance being estimated according to a predictive model of the provider depending on the selected query pattern, and a selector for selecting one of the providers according to the corresponding estimated performance and for causing the selected provider to discover the selected inventory information, the provider manager updating at least part of the models according to a result of the discovery; and wherein responsive to detecting an idle condition of the system according to a measured workload thereof, simulating the receiving of a dummy request for discovering further selected inventory information based on a further selected query pattern in response to the idle condition, the dummy request being associated with a further selected provider, causing the further selected provider to discover the further selected inventory information, and updating at least part of the models according to a result of the further discovery.

* * * * *